3,012,005
POLYMERS RESISTANT TO DISCOLORATION
Hans Bauer and Joseph Heckmaier, Burghausen, Germany, assignors to Wacker-Chemie G.m.b.H., Munich, Germany, a firm of Germany
No Drawing. Filed May 11, 1959, Ser. No. 812,089
3 Claims. (Cl. 260—45.7)

Polymers of vinyl chloride and copolymers of vinyl chloride with other vinyl monomers such as vinyl acetate frequently exhibit a tendency toward discoloration when converted into plastic masses particularly when their manufacture involves the use of the common lead compounds which are employed as stabilizers. This tendency toward discoloration makes the manufacture of these polymers into articles of a clear white color or in delicate pastel shades very difficult and frequently impossible.

It is, therefore, an important object of this invention to provide an improved process for the production of vinyl chloride polymers or of copolymers of vinyl chloride and vinyl compounds polymerizable therewith which may be stabilized with the usual lead compounds yet which exhibit marked resistance toward discoloration. Other objects of this invention will appear from the following detailed description.

It has been found that by the addition of certain inorganic acids or anhydrides of said acids to the reaction medium in which the vinyl chloride polymerization or copolymerization with another vinyl monomer is effected, especially the addition of an acid whose dissociation constant is below $1 \times 10^{-9}$, this problem of discoloration may be completely overcome. As acids which are particularly useful for this purpose there may be mentioned boric acid and silicic acid. The anhydride of silicic acid, silicon dioxide, is also very useful in the present process. Their stabilizing action in the instant process is not only quite effective but is quite free of any undesirable side-effects on the polymer.

In addition, the use of these auxiliary acid agents has been observed to result in an improvement in the specific resistance of the vinyl chloride polymers obtained. The desired improvement in the color stability and electrical properties of these vinyl chloride polymers is obtained by the addition of the acid agent in an amount of up to 3% by weight of the polymer. The acid agent is effective in amounts as low as 0.1% by weight and even less.

In order further to illustrate this invention the following examples are given:

*Example 1*

150 kilos of water, 75 kilos of vinyl chloride monomer, 112 grams of partially acetylated polyvinyl alcohol having a saponification value of 100, 113 grams of dilauroyl peroxide and 200 grams of boric acid are introduced into an autoclave equipped with a stirrer and the monomer present is polymerized, the reaction being carried out at a temperature of 50° C. until about 90% of the monomer present has undergone polymerization. The polymer formed is separated and is then worked up into a plastic mass at a temperature of 175° C. in admixture with 35% by weight of dioctyl phthalate as plasticizer and 1% by weight of dibasic lead stearate as stabilizer. After being thoroughly converted the outer surface of the plastic mass obtained remains a desirable and satisfactory white color. When the foregoing polymerization is carried out without the addition of boric acid, the plastic mass obtained after conversion using the same operating temperature and the same plasticizer and stabilizer is found to be a yellow or a yellow-brown color.

*Example 2*

When the polymerization described in Example 1 is carried out using 2% by weight of the finely-divided silicon dioxide obtained by the thermal decomposition of silicic acid, for example, the silicon dioxide available under the tradename "Aerosil," and the polymer formed is then converted into a plastic mass employing the same proportions of dioctyl phthalate as plasticizer and of lead stearate as stabilizer, the plastic mass obtained is observed to be free of any yellow or yellow-brown discoloration.

*Example 3*

140 parts by weight of the vinyl chloride polymer obtained in accordance with the process described in Example 1 are thoroughly converted into a plastic mass after addition thereto of a mixture of 60 parts by weight of dioctyl phthalate, 1.4 parts by weight of lead stearate, 4.2 parts by weight of basic lead sulfate and 14 parts by weight of a suitable pigment, such as titanium dioxide. A slab molded of this plastic mass is soaked in water for 24 hours at a temperature of 20° C. and then for an additional ½ hour at a temperature of 60° C. A measurement of the specific resistance of the resulting molded material indicates that the specific resistance is $22500 \cdot 10^9$ ohms, the specific resistance being measured as that of a cylinder one cm. in length and one cm. square in cross section. The specific resistance of a test specimen prepared in the same manner with the exception of the fact that no silicon dioxide is employed during the polymerization reaction has a specific resistance of but one-tenth that of the test specimen prepared in the above manner.

*Example 4*

When a mixure containing 3% by weight of vinyl acetate on the weight of the vinyl chloride monomer present is employed in preparing a polymer following the method described in Examples 1, 2 and 3 above, the polymers obtained remain free of color even after the compositions into which they are formed contain dibasic lead stearate as a stabilizer in similar amounts.

We claim:
1. In a process for the production of polymers having improved color stability and resistance to discoloration in the presence of lead stabilizing agents, the step which comprises polymerizing monomers of the group consisting of vinyl chloride and admixtures of vinyl chloride with a vinyl monomer copolymerizable therewith in a polymerization medium containing an effective amount but at most 3% by weight on the monomer of a member of the group consisting of silicic acid and its anhydride.
2. Process in accordance with claim 1 wherein said anhydride is silicon dioxide.
3. Process in accordance with claim 1 wherein the copolymer formed is a copolymer of vinyl chloride and vinyl acetate.

References Cited in the file of this patent
UNITED STATES PATENTS
2,617,783    Slocombe et al. _____ Nov. 11, 1952